(12) United States Patent
Nguyen et al.

(10) Patent No.: US 11,043,209 B2
(45) Date of Patent: Jun. 22, 2021

(54) SYSTEM AND METHOD FOR NEURAL NETWORK ORCHESTRATION

(71) Applicant: Veritone, Inc., Costa Mesa, CA (US)

(72) Inventors: Peter Nguyen, Costa Mesa, CA (US); David Kettler, Bellevue, WA (US); Karl Schwamb, Mission Viejo, CA (US); Chad Steelberg, Irvine, CA (US)

(*) Notice: Subject to any disclaimer, the term of this patent is extended or adjusted under 35 U.S.C. 154(b) by 129 days.

(21) Appl. No.: 16/243,033

(22) Filed: Jan. 8, 2019

(65) Prior Publication Data

US 2020/0043474 A1 Feb. 6, 2020

Related U.S. Application Data

(60) Provisional application No. 62/713,937, filed on Aug. 2, 2018.

(51) Int. Cl.
| | |
|---|---|
| *G10L 15/16* | (2006.01) |
| *G06K 9/62* | (2006.01) |
| *G06N 3/04* | (2006.01) |
| *G10L 25/78* | (2013.01) |
| *G10L 15/32* | (2013.01) |

(Continued)

(52) U.S. Cl.
CPC .......... *G10L 15/16* (2013.01); *G06K 9/6227* (2013.01); *G06K 9/6262* (2013.01); *G06K 9/6278* (2013.01); *G06N 3/04* (2013.01); *G06N 3/0454* (2013.01); *G06N 3/0472* (2013.01); *G06N 3/08* (2013.01); *G10L 15/02* (2013.01); *G10L 15/04* (2013.01); *G10L 15/063* (2013.01); *G10L 15/22* (2013.01); *G10L 15/32* (2013.01); *G10L 25/78* (2013.01); *G06N 5/003* (2013.01)

(58) Field of Classification Search
CPC .......... G10L 15/02; G10L 15/16; G10L 15/32; G06K 9/6227; G06N 5/003; G06N 3/08; G06N 3/088

See application file for complete search history.

(56) References Cited

U.S. PATENT DOCUMENTS 9,721,561 B2 * 8/2017 Tang ....................... G10L 15/07
9,805,716 B2 * 10/2017 Lee ......................... G10L 15/16
(Continued)

OTHER PUBLICATIONS

Seide, Frank, Gang Li, and Dong Yu. "Conversational speech transcription using context-dependent deep neural networks." Twelfth annual conference of the international speech communication association. 2011. (Year: 2011).*

(Continued)

*Primary Examiner* — Daniel C Washburn
*Assistant Examiner* — Oluwadamilola M Ogunbiyi
(74) *Attorney, Agent, or Firm* — One LLP

(57) ABSTRACT

Methods and systems for training one or more neural networks for transcription and for transcribing a media file using the trained one or more neural networks are provided. One of the methods includes: segmenting the media file into a plurality of segments; extracting, using a first neural network, audio features of a first and second segment of the plurality of segments; and identifying, using a second neural network, a best-candidate engine for each of the first and second segments based at least on audio features of the first and second segments. A best-candidate engine is a neural network having a highest predicted transcription accuracy among a collection of neural networks.

20 Claims, 9 Drawing Sheets

(51) Int. Cl.
*G10L 15/02* (2006.01)
*G10L 15/04* (2013.01)
*G06N 3/08* (2006.01)
*G10L 15/22* (2006.01)
*G10L 15/06* (2013.01)
*G06N 5/00* (2006.01)

(56) References Cited

U.S. PATENT DOCUMENTS

| | | | | |
|---|---|---|---|---|
| 9,984,682 | B1* | 5/2018 | Tao | G09B 19/04 |
| 10,627,820 | B1* | 4/2020 | Abeloe | B60W 30/0956 |
| 2008/0208577 | A1* | 8/2008 | Jeong | G10L 15/16 |
| | | | | 704/231 |
| 2009/0319267 | A1* | 12/2009 | Kurki-Suonio | G10L 15/30 |
| | | | | 704/235 |
| 2011/0087491 | A1 | 4/2011 | Wittenstein et al. | |
| 2014/0088978 | A1 | 3/2014 | Mundt et al. | |
| 2014/0149112 | A1* | 5/2014 | Kalinli-Akbacak | G10L 15/04 |
| | | | | 704/232 |
| 2015/0161522 | A1* | 6/2015 | Saon | G06N 3/0454 |
| | | | | 706/12 |
| 2016/0188575 | A1* | 6/2016 | Sawaf | G06F 40/58 |
| | | | | 704/2 |
| 2016/0217367 | A1* | 7/2016 | Moreno | G10L 15/16 |
| 2016/0307098 | A1 | 10/2016 | Goel et al. | |
| 2017/0011738 | A1* | 1/2017 | Senior | G10L 15/063 |
| 2017/0068888 | A1 | 3/2017 | Chung et al. | |
| 2017/0110120 | A1* | 4/2017 | Yu | G10L 25/84 |
| 2017/0140759 | A1 | 5/2017 | Kumar et al. | |
| 2017/0194186 | A1* | 7/2017 | Andry | H01L 21/6836 |
| 2017/0294186 | A1* | 10/2017 | Pinto | G10L 15/063 |
| 2017/0301347 | A1* | 10/2017 | Fuhrman | G10L 15/063 |
| 2018/0061397 | A1* | 3/2018 | Huang | G10L 15/063 |
| 2018/0101533 | A1* | 4/2018 | Robichaud | G06F 16/24578 |
| 2018/0130484 | A1 | 5/2018 | Dimino, Jr. et al. | |
| 2018/0137857 | A1* | 5/2018 | Zhou | G10L 15/32 |
| 2018/0174576 | A1* | 6/2018 | Soltau | G06N 3/084 |
| 2018/0176641 | A1* | 6/2018 | Yun | H04N 21/44016 |
| 2018/0277100 | A1* | 9/2018 | Cassagne | G06N 20/00 |
| 2018/0322961 | A1* | 11/2018 | Kim | G06N 3/08 |
| 2018/0336887 | A1* | 11/2018 | Song | G06N 3/02 |
| 2019/0088251 | A1* | 3/2019 | Mun | G10L 15/187 |
| 2019/0130897 | A1* | 5/2019 | Zhou | G10L 15/16 |
| 2019/0156837 | A1* | 5/2019 | Park | G06N 3/0454 |
| 2019/0164538 | A1* | 5/2019 | Seo | G10L 15/285 |
| 2019/0205748 | A1* | 7/2019 | Fukuda | G06N 3/08 |
| 2019/0206389 | A1* | 7/2019 | Kwon | G10L 15/22 |
| 2019/0222943 | A1* | 7/2019 | Andersen | G10L 21/0364 |
| 2019/0279646 | A1* | 9/2019 | Tian | G10L 15/183 |
| 2019/0295531 | A1* | 9/2019 | Rao | G10L 13/00 |
| 2019/0339687 | A1* | 11/2019 | Cella | G06N 5/046 |
| 2019/0341052 | A1* | 11/2019 | Allibhai | G10L 15/22 |
| 2019/0341058 | A1* | 11/2019 | Zhang | G06N 3/0454 |
| 2020/0020093 | A1* | 1/2020 | Frei | G06N 3/08 |
| 2020/0043483 | A1* | 2/2020 | Prabhavalkar | G10L 15/22 |
| 2020/0051550 | A1* | 2/2020 | Baker | G10L 15/02 |
| 2020/0168208 | A1* | 5/2020 | Mitra | G10L 15/075 |

OTHER PUBLICATIONS

A. Graves, A. Mohamed and G. Hinton, "Speech recognition with deep recurrent neural networks," 2013 IEEE International Conference on Acoustics, Speech and Signal Processing, Vancouver, BC, 2013, pp. 6645-6649, doi: 10.1109/ICASSP.2013.6638947. (Year: 2013).*
Cai, Meng, Yongzhe Shi, and Jia Liu. "Deep maxout neural networks for speech recognition." 2013 IEEE Workshop on Automatic Speech Recognition and Understanding. IEEE, 2013. (Year: 2013).*
PCT/US2019/044813 ISR and Written Opinion dated Oct. 25, 2019.

* cited by examiner

SYSTEM AND METHOD FOR NEURAL NETWORK ORCHESTRATION

CROSS-REFERENCE TO RELATED APPLICATIONS

This application claims priority under 35 U.S.C. § 119(e) to U.S. Provisional Application No. 62/713,937 entitled "MACHINE LEARNING", filed Aug. 2, 2018, the disclosure of which is incorporated herein by reference in its entirety for all purposes.

BACKGROUND

Based on one estimate, 90% of all data in the world today are generated during the last two years. Quantitively, that is more than 2.5 quintillion bytes of data are being generated every day; and this rate is accelerating. This estimate does not include ephemeral media such as live radio and video broadcasts, most of which are not stored.

To be competitive in the current business climate, businesses should process and analyze big data to discover market trends, customer behaviors, and other useful indicators relating to their markets, product, and/or services. Conventional business intelligence methods traditionally rely on data collected by data warehouses, which is mainly structured data of limited scope (e.g., data collected from surveys and at point of sales). As such, businesses must explore big data (e.g., structured, unstructured, and semi-structured data) to gain a better understanding of their markets and customers. However, gathering, processing, and analyzing big data is a tremendous task to take on for any corporation.

Additionally, it is estimated that about 80% of the world data is unreadable by machines. Ignoring this large portion of unreadable data could potentially mean ignoring 80% of the additional data points. Accordingly, to conduct proper business intelligence studies, businesses need a way to collect, process, and analyze big data, including machine unreadable data.

SUMMARY

Provided herein are embodiments of systems and methods for transcribing a media file (e.g., audio, video, multimedia file). One of the methods includes: segmenting the media file into a plurality of segments; extracting, using a first neural network, audio features of a first and second segment of the plurality of segments; and identifying, using a second neural network, a best-candidate engine for each of the first and second segments based at least on audio features of the first and second segments. A best-candidate engine is a neural network having a highest predicted transcription accuracy among a collection of neural networks.

The method further includes: requesting a first best-candidate engine for the first segment to transcribe the first segment; requesting a second best-candidate engine for the second segment to transcribe the second segment; receiving a first transcribed portion of the first segment from the first best-candidate engine in response to requesting the first best-candidate engine to transcribe the first segment; receiving a second transcribed portion of the second segment from the second best-candidate engine in response to requesting the second best-candidate engine to transcribe the second segment; and generating a merged transcription using the first and second transcribed portions.

Extracting audio features using the first neural network can include using a deep neural network to extract audio features of the first and second segments. The deep neural network can be a recurrent neural network. The deep neural network can be a Deep Speech neural network by Mozilla Research. Audio features can be extracted from the deep neural network by using outputs from one or more hidden layers of the deep neural network. For example, outputs from the first and last hidden layers can be used as inputs for the second neural network, which can be a convolutional neural network. In another example, outputs from the second and the penultimate hidden layers can be used as inputs to the second neural network. In some embodiments, the deep neural network can be trained to perform speech recognition (e.g., ingest speech spectrogram and generate text).

The second neural network can be a neural network that is trained to predict a word error rate (WER) of a plurality of transcription engines based at least on audio features extracted from each audio segment and/or characteristics of each respective engine of the plurality of transcription engines. The best-candidate engine can be an engine having the lowest WER (the highest accuracy) among a collection of transcription engines.

Also disclosed is a system for transcribing a media file. The system includes: a memory; and one or more processors coupled to the memory, the one or more processor configured to: segment the media file into a plurality of segments; extract, using a first neural network, audio features of a first and second segment of the plurality of segments; and identify, using a second neural network, a best-candidate engine for each of the first and second segments based at least on audio features of the first and second segments. The best-candidate engine is a neural network having a highest predicted transcription accuracy among a collection of neural networks.

Also disclosed is a second method for transcribing an audio file. The second method includes: using an audio file of the plurality of audio segments as inputs to a deep neural network trained to perform speech recognition; and using outputs of one or more hidden layers of the deep neural network as inputs to a second neural network, which is trained to identify a first transcription engine having a highest predicted transcription accuracy among a group of transcription engines for the audio file based at least on the outputs of the one or more hidden layers of the deep neural network.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
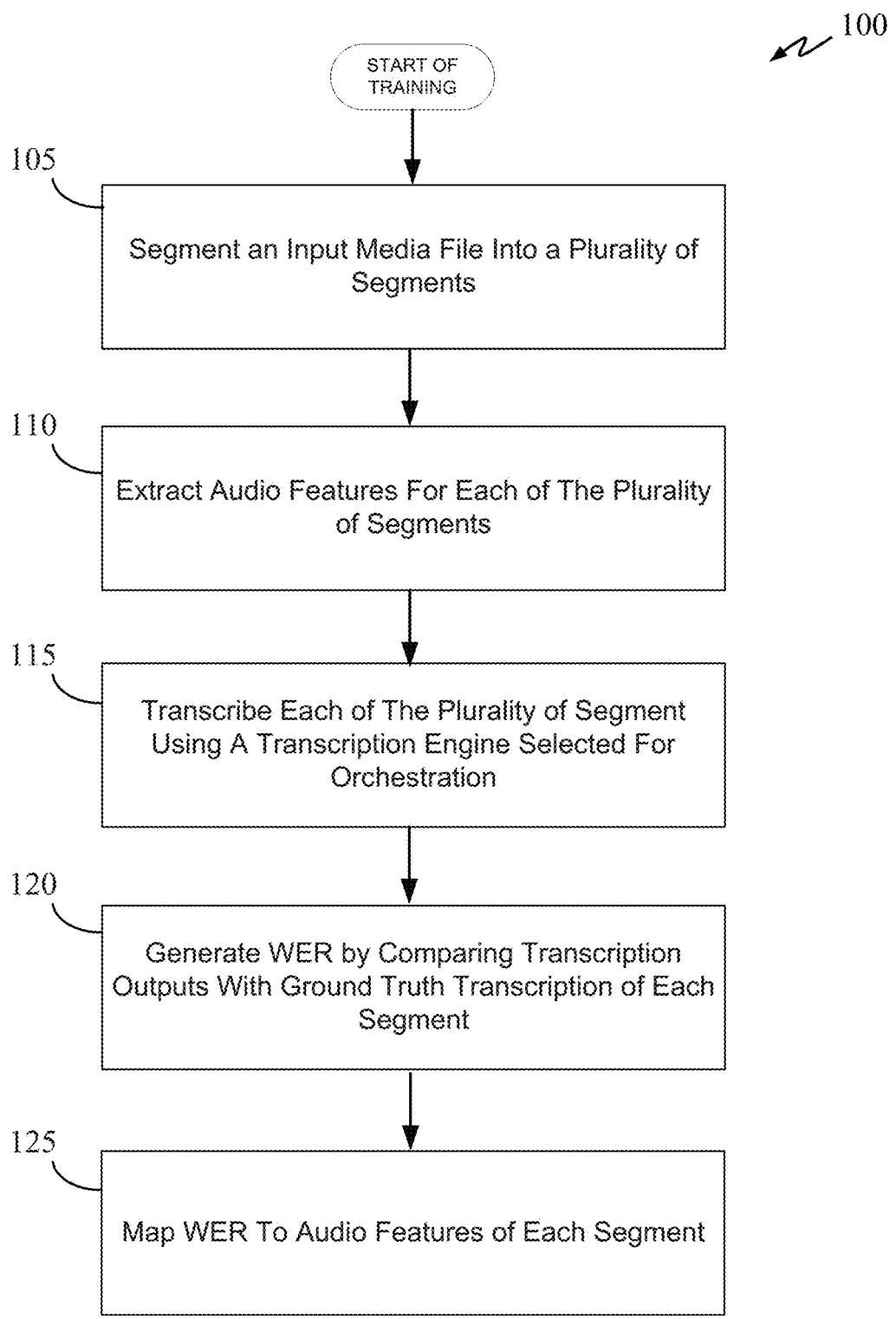
FIG. 1 is a flow diagram of a training process in accordance with an aspect of the disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

At the beginning of the decade (2010), there were only a few available commercial artificial intelligence (AI) engines. Today, there are well over 10,000 AI engines. It is expected that this number will exponentially increase within the next few years. With so many commercially available engines, it is almost an impossible task for businesses to choose which engines will perform the best for their type of data. Veritone's AI platform with the conductor and conducted learning technologies make that task not only possible but also practical and efficient.

In an example of an audio file, selecting the best AI engine to transcribe the audio file can be a daunting task given there are so many available transcription engines. Additionally, a trial and error approach for selecting an engine (e.g., AI engine) to transcribe the audio file can be time consuming, cost prohibitive, and inaccurate. Veritone's AI platform with the smart router conductor (SRC) technology enable a smart, orchestrated, and accurate approach to engine selection that yields a highly accurate transcription of the audio file.

The audio features of most audio files can be very dynamic. In other words, for a given audio file, the dominant features of the audio file can change from one segment of the audio file to another. For example, the first quarter segment of the audio file can have a very noisy background thereby giving rise to certain dominant audio features. The second quarter segment of the audio file can have multiple speakers, which can result in a different set of dominant audio features. The third and fourth quarter segments can have different scenes, background music, speakers of different dialects, etc. Accordingly, the third and fourth quarter segments can have different sets of dominant audio features. Given the dynamic nature of audio features of the audio file, it would be hard to identify a single transcription engine that can accurately transcribe all segments of the audio file.

The smart router conductor technology can segment an audio file by duration, audio features, topic, scene, metadata, a combination thereof, etc. In some embodiments, an audio file can be segmented by duration of 2-20 seconds. For example, the audio file can be segmented into a plurality of 5-second segments. In some embodiments, an audio file can be segmented by topic and duration, scene and duration, metadata and duration, etc. For example, the audio file can first be segmented by scenes. Then within each scene segment, the segment is segmented into 5-second segments. In another example, the audio file can be segmented by duration of 30-second segments. Then within each 30-second segment, the segment can be further segmented by topic, dominant audio feature(s), metadata, etc. Additionally, the audio file can be segmented at a file location where no speech is detected. In this way, a spoken word is not separated between two segments.

In some embodiments, for each segment of the audio file, the smart router conductor can predict one or more engines that can best transcribe the segment based at least on audio feature(s) of the segment. The best-candidate engine(s) can depend on the nature of the input media and the characteristics of the engine(s). In speech transcription, certain engines will be able to process special dialects better than others while some engines are better at processing noisy audio than others. It is best to select, at the front end, engine(s) that will perform well based on characteristics (e.g., audio features) of each segment of the audio file.

Audio features of each segment can be extracted using data preprocessing methods such as cepstral analysis to extract dominant mel-frequency cepstral coefficients (MFCC) or using outputs of one or more layers of a neural network trained to perform speech recognition (e.g., speech to text classification). In this way, the labor-intensive process of features engineering for each audio segment can be automatically performed using a neural network such as a speech recognition neural network, which can be a deep neural network (e.g., a recurrent neural network), a convolutional neural network, a hybrid deep neural network (e.g., deep neural network hidden Markov model (DNN-HMM)), etc. The smart router conductor can be configured to use outputs of one or more hidden layers of the speech recognition neural network to extract relevant (e.g., dominant) features of the audio file. In some embodiments, the smart router conductor can be configured to use outputs of one or more layers of a deep speech neural network, by Mozilla Research, which has five hidden layers. In this embodiment, outputs of one or more hidden layers of the deep speech neural network can be used as inputs of an engine prediction neural network. For example, outputs from the last hidden layer of a deep neural network (e.g., Deep Speech) can be used as inputs of an engine prediction neural network, which can be a fully-layered convolutional neural network. In another example, outputs from the first and last hidden layers of a deep neural network can be used as inputs of an engine prediction neural network. In essence the smart router conductor creates a hybrid deep neural network comprising of layers from a RNN at the frontend and a fully-layered CNN at the backend. The backend fully-layered CNN is trained to predict a best-candidate transcription engine given a set of outputs of one or more layers of the frontend RNN.

In some embodiments, the engine prediction neural network is configured to predict one or more best-candidate engines (engines with the best predicted results) based at least on the audio features of an audio spectrogram of the segment. For example, the engine prediction neural network is configured to predict one or more best-candidate engines based at least on outputs of one or more layers of a deep neural network trained to perform speech recognition. The outputs of one or more layers of a speech recognition deep neural network are representative of dominant audio features of a media (e.g., audio) segment.

The engine prediction neural network can be trained to predict the best-candidate engine by associating certain features of an audio to certain characteristics (e.g., neural network architecture, hyperparameters) of one or more engines. The engine prediction neural network can be trained using training data set that includes hundreds or thousands of hours of audio and respective ground truth data. In this way, the engine prediction neural network can associate a certain set of dominant audio features to characteristics of one or more engines, which will be selected to transcribe the audio segment having that certain set of dominant audio features. In some embodiments, the engine prediction neural network is the last layer of a hybrid deep neural network, which consists of one or more layers from a deep neural network and one or more layers of the engine prediction neural network.

In some embodiments, audio features of an audio can be automatically extracted by one or more hidden layers of a deep neural network such as a deep speech neural network. The extracted audio features can then be used as inputs of an engine prediction neural network that is configured to determine the relationship(s) between the word error rate (WER) and the audio features of each audio segment. During the training stage, outputs from one or more layers of the deep neural network can be used to train the engine prediction neural network. In the production stage, outputs from one or more layers of the deep neural network can be used as inputs to the pre-trained engine prediction neural network to generate a list of one or more transcription engines having the lowest WER. In some embodiments, the engine prediction neural network can be a CNN trained to predict the WER of an engine based at least on audio features of an audio segment and/or on the engine's characteristics. In some embodiments, the engine prediction neural network is configured to determine the relationship between the WER of an engine and the audio features of a segment using statistical method such as regression analysis, correlation analysis, etc. The WER can be calculated based at least on the comparison of the engine outputs with the ground truth transcription data. It should be noted that low WER means higher accuracy.

Once the engine prediction neural network is trained to learn the relationship between one or more of the WER of an engine, characteristics of an engine, and the audio features of an audio segment (having a certain audio features), the smart router conductor can orchestrate the collection of engines in the conductor ecosystem to transcribe the plurality of segments of the audio file based on the raw audio features of each audio segment. For example, the smart router conductor can select which engine (in the ecosystem of engines) to transcribe which segment (of the plurality of segments) of the audio file based at least on the audio features of the segment and the predicted WER of the engine associated with that segment. For instance, the smart router conductor can select engine "A" having a low predicted (or lowest among engines in the ecosystem) WER for a first set of dominant cepstral features of a first segment of an audio file, which is determined based at least on association(s) between the first set of dominant cepstral features and certain characteristics of engine "A." Similarly, the smart router conductor can also select engine "B" having a low predicted WER for another set of dominant cepstral features for a second segment of the audio file. Each set of dominant cepstral features can have one or more cepstral features. In another example, the smart router conductor can select engine "C" based at least on a set of dominant cepstral features that is associated with an audio segment with a speaker having a certain dialect. In this example, the "C" engine can have the lowest predicted WER value (as compared with other engines in the ecosystem) associated with the set of cepstral features that is dominant with that dialect. In another example, the smart router conductor can select engine "D" based at least on a set of dominant cepstral features that is associated with: (a) an audio segment having a noisy background, and (b) certain characteristics of engine "D."

Preemptive Orchestration

FIG. 1 illustrates a training process 100 for training an engine prediction neural network to preemptively orchestrate (e.g., pairing) a plurality of media segments with corresponding best transcription engines based at least on extracted audio features of each segment in accordance with some embodiments of the present disclosure. The engine prediction neural network can be a backend of hybrid deep neural network (see FIG. 3) having a frontend and backend neural networks, which can have the same or different neural network architectures. The frontend neural network of the hybrid deep neural network can be a pre-trained speech recognition neural network. In some embodiments, the backend neural network makes up the engine prediction neural network, which is trained by process 100 to predict an engine's WER based at least on audio features of an audio segment. The engine prediction neural network (e.g., backend neural network of the hybrid deep neural network) can be a neural network such as, but not limited to, a deep neural network (e.g., RNN), a feedforward neural network, a convolutional neural network (CNN), a faster R-CNN, a mask R-CNN, a SSD neural network, a hybrid neural network, etc.

Process 100 starts 105 where the input media file of a training data set is segmented into a plurality of segments. The input media file can be an audio file, a video file, or a multimedia file. In some embodiments, the input media file is an audio file. The input media file can be segmented into a plurality of segments by time duration. For example, the input media file can be segmented into a plurality of 5-second or 10-second segments. Each segment can be preprocessed and transformed into an appropriate format for use as inputs of a neural network. For example, an audio segment can be preprocessed and transformed into a multidimensional array or tensor. Once the media segment is preprocessed and transformed into the appropriate data format (e.g., tensor), the preprocessed media segment can be used as inputs to a neural network.

At 110, the audio features of each segment of the plurality of segments are extracted. This can be done using data preprocessors such as cepstral analyzer to extract dominant mel-frequency cepstral coefficients. Typically, further features engineering and analysis are required to appropriately identify dominant mel-frequency cepstral coefficients.

In some embodiments, subprocess 110 can use a pre-trained speech recognition neural network to identify dominant audio features of an audio segment. Dominant audio features of the media segment can be extracted from the outputs (e.g., weights) of one or more nodes of the pre-trained speech recognition neural network. Dominant audio features of the media segment can also be extracted from the outputs of one or more layers of the pre-trained speech recognition neural network. Outputs of one or more hidden nodes and/or layers can be representative of dominant audio features of an audio spectrogram. Accordingly, using outputs of layer(s) of the pre-trained speech recognition neural network eliminates the need to perform additional features engineering and statistical analysis (e.g., hot encoding, etc.) to identify dominant features.

In some embodiments, subprocess 110 can use outputs of one or more hidden layers of a recurrent neural network (trained to perform speech to text classification) to identify dominant audio features of each segment. For example, a recurrent neural network such as the deep speech neural network by Mozilla can be modified by removing the last character prediction layer and replacing it with an engine prediction layer, which can be a separate, different, and fully layered neural network. Inputs that were meant for the character prediction layer of the RNN is then used as inputs for the new engine prediction layer or neural network. In other words, outputs of one or more hidden layers of the RNN are used as inputs to the new engine prediction neural network. The engine prediction layer, which will be further discussed in detail below, can be a regression-based neural network that predicts relationships between the WER of an engine and the audio features (e.g., outputs of one or more layers of the RNN) of each segment.

At 115, each engine to be orchestrated in the engine ecosystem can transcribe the entire input media file used at subprocesses 105 and 110. Each engine can transcribe the input media file by segments. The transcription results of each segment will be compared with the ground truth transcription data of each respective segment at 120 to generate a WER of the engine for the segment. For example, to train the engine prediction neural network to predict the WER of an engine for an audio segment, the engine must be used in the training process, which can involve transcribing a training data set with ground truth data. The transcription results from the engine will then be compared with the ground truth data to generate the WER for the engine for each audio segment, which can be seconds in length. Each engine can have many WERs, one WER for each segment of the audio file.

Each media file of the training data set used to train the engine prediction neural network includes an audio file and the ground truth transcription of the audio file. To train the engine prediction neural network to perform engine prediction for objection recognition, each media file of the training data set can include a video portion and ground truth metadata of the video. The ground truth metadata of the video can include identifying information that identifies and describes one or more objects in the video frame. For example, the identifying information of an object can include hierarchical class data and one or more subclass data. A class data can include information such as, but not limited to, whether the object is an animal, a man-made object, a plant, etc. Subclass data can include information such as, but not limited to, the type of animal, gender, color, size, etc.

In some embodiments, the audio file and the ground truth transcript can be processed by a speech-to-text analyzer to generate timing information for each word. For example, the speech-to-text analyzer can ingest both the ground truth transcript and the audio data as inputs to generate timing information for the ground truth transcription. In this way, each segment can include spoken word data and the timing of each spoken word. This enables the engine prediction neural network to be trained to make associations between the spoken word of each segment and corresponding audio features of the segment of the media file.

At 125, the engine prediction neural network is trained to map the engine calculated WER of each segment to audio features of each segment. In some embodiments, the engine prediction neural network can use a regression analysis to learn the relationship(s) between the engine WER and the audio features of each segment. For example, the engine prediction neural network can use a regression analysis to learn the relationship(s) between the engine WER for each segment and the outputs of one or more hidden layers from a deep neural network trained to perform speech recognition. Once trained, the engine prediction neural network can predict the WER of a given engine based at least on the audio features of an audio segment. Inherently, the engine prediction neural network can also learn the association between an engine WER and various engine characteristics and dominant audio features of the segment.

In some embodiments, the backend neural network can be one or more layers of the deep speech neural network by Mozilla Research. In this embodiment, the deep speech neural network is configured to analyze an audio file in time steps of 20 milliseconds. Each time step can have 2048 features. The 2048 features of each time step can be used as inputs for a new fully-connected layer that has a number of outputs equal to the number of engines being orchestrated. Since a time step of 20 milliseconds is too fine for predicting the WER of a 5-second duration segment, the mean over many time steps can be calculated. Accordingly, the engine prediction layer of the deep speech neural network (e.g., RNN) can be trained based at least on the mean squared error with respect to known WER (WER based on ground truth data) for each audio segment.

In some embodiments, engine prediction neural network can be a CNN, which can have filters that combine inputs from several neighboring time steps into each output. These filters are then scanned across the input time domain to generate outputs that are more contextual than outputs of a RNN. In other words, the outputs of a CNN filter of a segment are more dependent on the audio features of neighboring segments. In a CNN, the number of parameters is the number of input channels times the number of output channels times the filter size. A fully connected layer that operates independently on each time step is equivalent to a CNN with a filter size of one and thus the number of parameters can be the number of input channels times the number of output channels. However, to reduce the number of parameters, neighboring features can be combined with pooling layers to reduce the dimension the CNN.

In some embodiments, neighboring points of a CNN layer can be combined by using pooling methods. The pooling method used by process 100 can be an average pooling operation as empirical data show that it performs better than a max pooling operation for transcription purposes.

It should be noted that one or more subprocesses of process 100 can be performed interchangeably. In other words, one or more subprocesses such as subprocesses 105, 110, 115, and 120 can be performed in different orders or in parallel. For example, subprocesses 115 and 120 can be performed prior to subprocesses 105 and 110.

Figure 2:
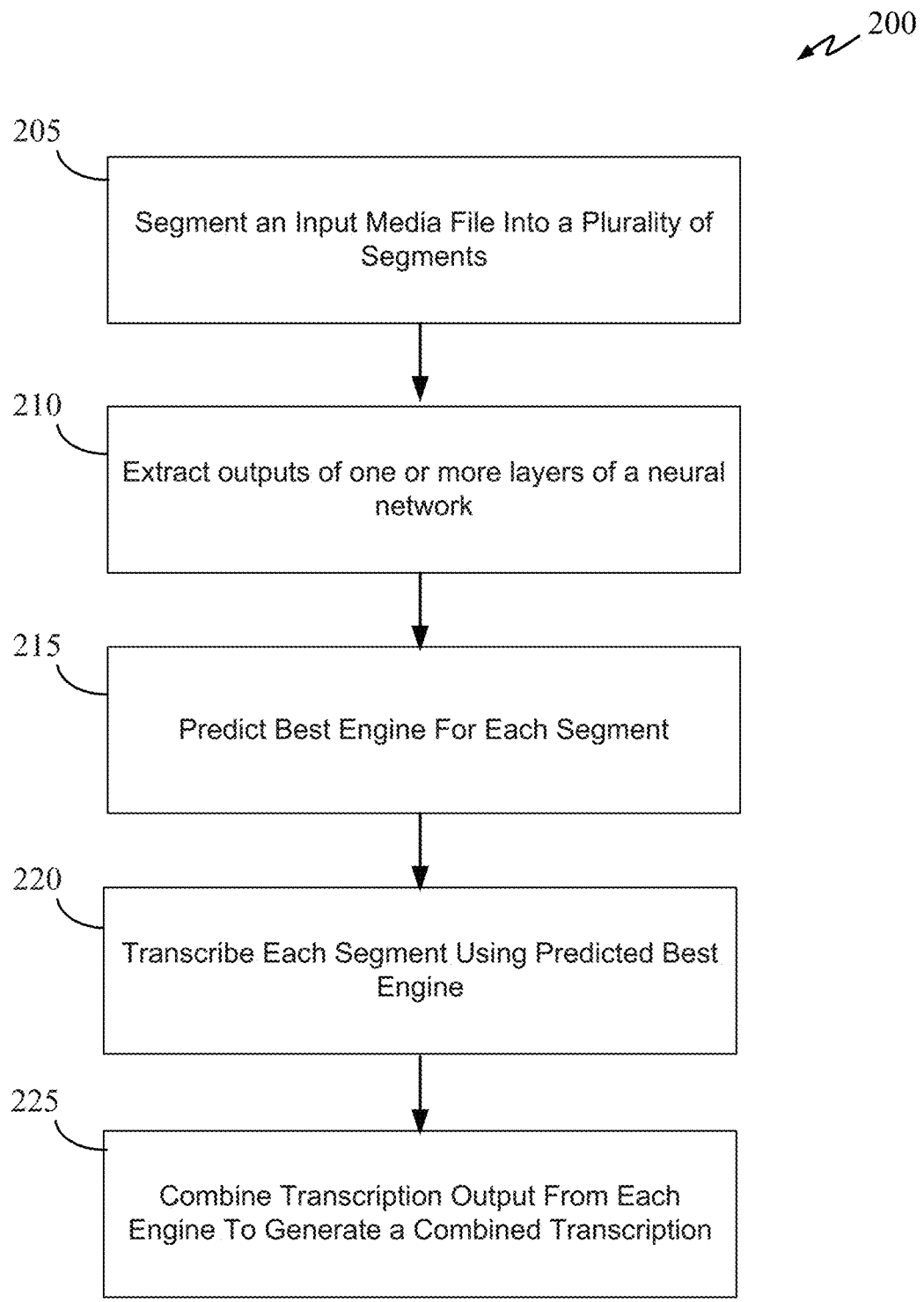
FIG. 2 is a flow diagram of a transcription process in accordance with an aspect of the disclosure.

FIG. 2 illustrates a process 200 for transcribing an input media file using a hybrid neural network that can preemptive orchestrate a group of engines of an engine ecosystem in accordance with some embodiments of the present invention. Process 200 starts at 205 where the input media file is segmented into a plurality of segments. The media file can be segmented based on a time duration (segments with a fixed time duration), audio features, topic, scene, and/or metadata of the input media file. The input media file can also be segmented using a combination of the above variables (e.g., duration, topic, scene, etc.).

In some embodiments, the media file (e.g., audio file, video file) can be segmented by duration of 2-10 seconds. For example, the audio file can be segmented into a plurality segments having an approximate duration of 5 seconds. Further, the input media file can be segmented by duration and only at locations where no speech is detected. In this way, the input media file is not segmented such that a word sound is broken between two segments.

The input media file can also be segmented based on two or more variables such as topic and duration, scene and duration, metadata and duration, etc. For example, subprocess 105 can use a segmentation module (see item 8515 of FIG. 8) to segment the input media file by scenes and then by duration to yield 5-second segments of various scenes. In another example, process 200 can segment by a duration of 10-second segments and then further segment each 10-second segment by certain dominant audio feature(s) or scene(s). In some embodiments, the scene of various segments of the input media file can be identified using metadata of the input media file or using a neural network trained to identify scenes, using metadata and/or images, from the input media file. Each segment can be preprocessed and transformed into an appropriate format for use as inputs of a neural network Starting at subprocess 210, a hybrid deep neural network can be used to extract audio features of the plurality of segments and to preemptively orchestrate (e.g., pairing) the plurality of segments with corresponding best transcription engines based at least on the extracted audio features of each segment. The hybrid deep neural network can include two or more neural networks of different architectures (e.g., RNN, CNN). In some embodiments, the hybrid deep neural network can include a RNN frontend and a CNN backend. The RNN frontend can be trained to ingest speech spectrograms and generate text. However, the goal is not to generate a text associated with the ingested speech spectrograms. Here, only outputs of one or more hidden layers of the RNN frontend are of interest. The outputs of the one or more hidden layers represent dominant audio features of the media segment that have been automatically generated by the layers of the RNN frontend. In this way, audio features for the media segment do not have to be manually engineered.

At 215, the CNN backend can be an engine prediction neural network trained to identify a list of best-candidate engines for transcribing each segment based on at least audio features (e.g., outputs of RNN frontend) of the segment and the predicted WER of each engine for the segment. The list of best-candidate engines can have one or more engines identified for each segment. A best-candidate engine is an engine that is predicted to provide results having a certain level of accuracy (e.g., WER of 15% or less). A best-candidate engine can also be an engine that is predicted to provide the most accurate results compared to other engines in the ecosystem. When the list of best-candidate engines has two or more engines, the engines can be ranked by accuracy. In some embodiments, each engine can have multiple WERs. Each WER of an engine is associated with one set of audio features of a segment of the audio file.

The trained engine prediction neural network is trained to predict an engine WER based at least on the engine characteristics and the raw audio features of an audio segment. In the training process, the engine prediction neural network is trained using training data set with ground truth data and WERs of segments of audio calculated based on the ground truth data. Ground truth data can include verified transcription data (e.g., 100% accurate, human verified transcription data) and other metadata such as scenes, topics, etc. In some embodiments, the engine prediction neural network can be trained using an objective function with engine characteristics (e.g., hyperparameters, weights of nodes) as variables.

At 220, each segment of the plurality of segments is transcribed by the predicted best-candidate engine. Once the best-candidate engine is identified for a segment, the segment can be made accessible to the best-candidate engine for transcription. Where more than one best-candidate engines are identified, the segment can be made available to both engines. The engine that returns a transcription output with the highest value of confidence will be used as the final transcription for that segment.

At 225, transcription outputs from the best-candidate engines sourced at 115 are combined to generate a combined transcription result.

Features extraction is a process that is performed during both the training stage and the production stage. In training stage, as in process 100, features extraction is performed at 110 where the audio features of the input media file are extracted by extracting outputs of one or more layers of a neural network trained to ingest audio and generate text. The audio features extraction process can be performed on a segment of an audio file or on the entire input file (and then segmented into portions). In the production stage, features extraction is performed on an audio segment to be transcribed so that the engine prediction neural network can use the extracted audio features to predict the WER of one or more engines in the engine ecosystem (for the audio segment). In this way, the engine with the highest predicted WER for an audio segment can be selected to transcribe the audio segment. This can save a significant amount of resources by eliminating the need to perform transcription using a trial and error or random approach to engine selection.

Figure 3:
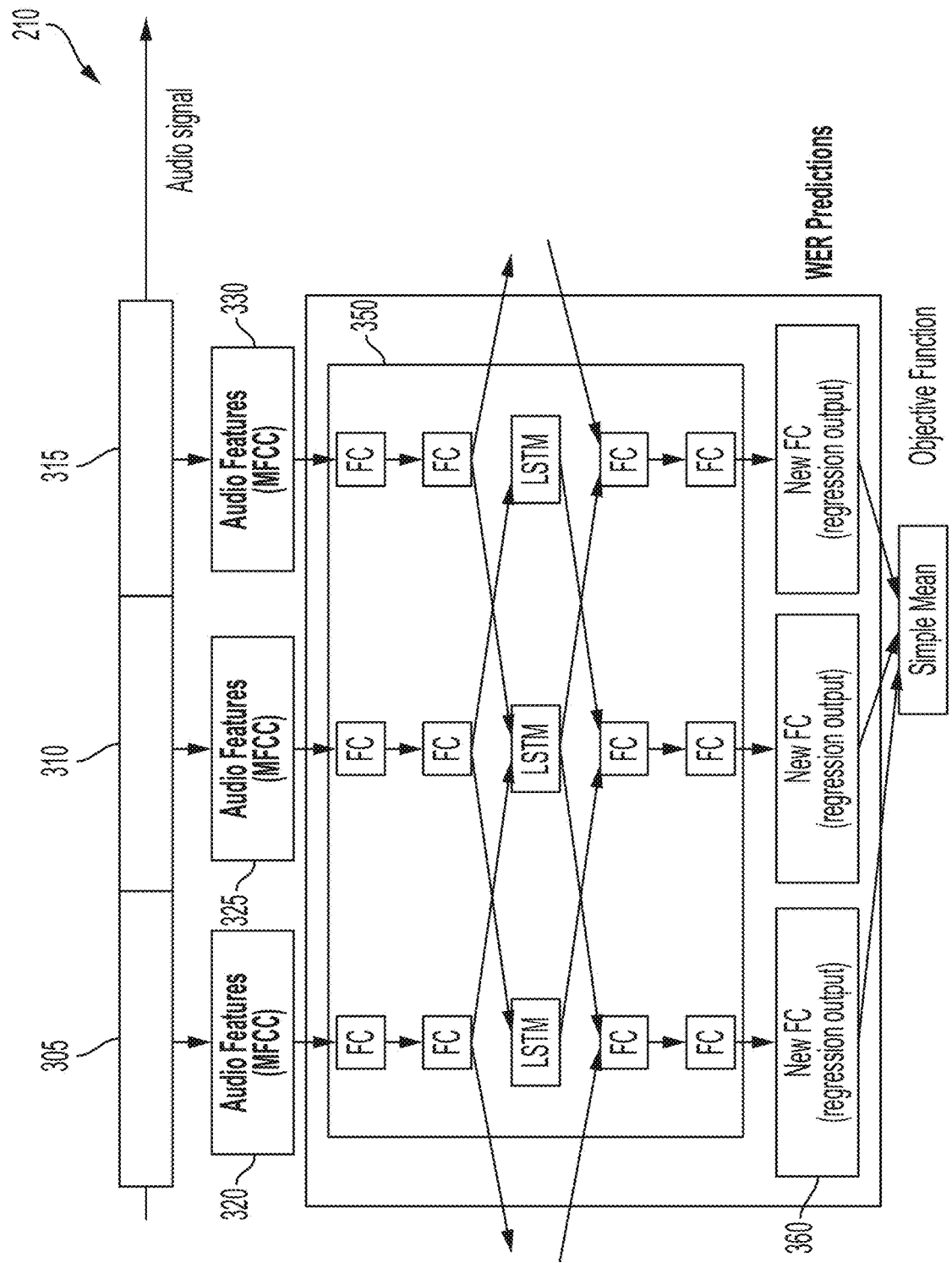
FIG. 3 is a diagram of a hybrid deep neural network in accordance with an aspect of the disclosure.

Feature extractions can be done using a deep speech neural network. Other types of neural network such as convolutional neural network (CNN) can also be used to ingest audio data and extract dominant audio features of the audio data. FIG. 3 graphically illustrates a hybrid deep neural network 300 used to extract audio features and to preemptively orchestrate audio segments to best candidate transcription engines in accordance with some embodiments of the present disclosure. In some embodiments, hybrid deep neural network 300 includes an RNN frontend 350 and a CNN backend 360. RNN frontend 350 can be a pre-trained speech recognition network, and CNN backend 360 can be an engine prediction neural network trained to predict the WERs of one or more engines in the engine ecosystem based at least on outputs from RNN frontend 350.

As shown, an audio signal can be segmented into small time segments 305, 310, and 315. Each of segments 305, 310, and 315 has its respective audio features 320, 325, and 330. However, at this stage in process 210, audio features of each segment are just audio spectrograms and the dominant features of the spectrograms are not yet known.

To extract the dominant audio features of each segment, the audio features are used as inputs to layers of neural network 350, which will automatically identify dominant features through its network of hidden nodes/layers and weights associated with each node. In some embodiments, neural network 350 can be a recurrent neural network with long short-term memory (LSTM) units, which can be composed of a cell, an input gate, an output gate and a forget gate. The cell of a LSTM unit can remember values over arbitrary time intervals and the three gates regulate the flow of information into and out of the cell. LSTM networks are well-suited for classifying, processing and making predictions based on time series data, since there can be lags of unknown duration between important events in a time series.

In some embodiments, neural network 350 can be a recurrent neural network with five hidden layers. The five hidden layers can be configured to encode phoneme(s) of the audio input file or phoneme(s) of a waveform across one or more of the five layers. The LSTM units are designed to remember values of one or more layers over a period of time such that one or more audio features of the input media file can be mapped to the entire phoneme, which can spread over multiple layers and/or multiple segments. The outputs of the fifth layer of the RNN are then used as inputs to engine-prediction layer 360, which can be a regression-based analyzer configured to learn the relationship between the dominant audio features of the segment and the WER of the engine for that segment (which was established at 120).

In some embodiments, the WER of a segment can be an average WER of a plurality of subsegments. For example, a segment can be 5 seconds in duration, and the WER for the 5-second segment can be an average of WERs for a plurality of 1-second segments. The WER of a segment can be a truncated average or a modified average of a plurality of subsegment WERs.

In a conventional recurrent neural network, the sixth or last layer maps the encoded phoneme(s) to a character, which is then provided as input to a language model to generate a transcription. However, in process 300, the last layer of the conventional recurrent neural network is replaced with engine-prediction layer 360, which is configured to map encoded phonemes (e.g., dominant audio features) to a WER of an engine for a segment. For example, engine-prediction layer 360 can map audio features 320 of segment 305 to a transcription engine by Nuance with a low WER score.

In some embodiments, during the training process, each engine that is to be orchestrated must be trained using training data with ground truth transcription data. In this way, the WER can be calculated based on the comparison of the engine outputs with the ground truth transcription data. Once a collection of engines is trained using the training data set to obtain the WER for each engine for each audio segment (having a certain audio features), the trained collection of engines can be orchestrated such that subprocess 215 (for example) can select one or more of the orchestrated engines (engines in the ecosystem that have been used to train engine prediction neural network) that can best transcribe a given media segment.

Empirical Data

Figure 4:
FIG. 4 is a chart illustrating the level of transcription accuracy improvement of the transcription process of FIG. 2 over conventional transcription systems.

FIG. 4 is a bar chart 500 illustrating the improvements for engines outputs using the smart router conductor with preemptive orchestration. As shown in FIG. 4, a typical baseline accuracy for any engine is 57% to 65% accuracy. However, using the smart router conductor (e.g., processes 100 and 200, and hybrid deep neural network 300) the accuracy of the resulting transcription can be dramatically improved. In one scenario, the improvement is 19% better than the next best transcription engine working alone.

Example Engine Prediction Neural Network Structure

As previously mentioned, the backend neural network used to orchestrate transcription engine (e.g., engine prediction based on audio features of a segment) can be, but not limited, to an RNN or a CNN. For a backend RNN, the average WER of multiple timesteps (e.g., segments) can be used to obtain a WER for a specific time duration. In some embodiments, the backend neural network is a CNN with two layers and one pooling layer between the two layers. The first CNN layer can have a filter size of 3 and the second layer can have a filter size of 5. The number of outputs of the second layer is equal to the number of engines being orchestrated (e.g., classification). Orchestration can include a process that classifies how accurate each engine of a collection of engines transcribes an audio segment based on the raw audio features of the audio segment. In other words, preemptively orchestration can involve the pairing of a plurality of media segments with corresponding best transcription engines based at least on extracted audio features of each segment. For instance, each audio segment can be paired with one or more best transcription engines by the backend CNN (e.g., orchestrator).

In some embodiments, outputs from the last layer of frontend neural network (e.g., deep speech) are used as inputs to the backend CNN. For example, outputs from the fifth layer of the deep speech neural network can be used as inputs to the backend CNN. Outputs from the fifth layer of the deep speech neural network can have 2048 features per time step. The number of channels (one for each of the 2048 features) in between the two layers is a free parameter. Accordingly, there can be a lot of parameters due to the 2048 input channels, which leads to a CNN with very large dimensions.

In some embodiments, to deal with the large dimensions in the backend CNN, a dimension reduction layer is used. The dimension reduction layer can be a CNN layer with a filter size of 1. This is equivalent to a fully connected layer that operates independently on each time step. In this embodiment, the number of parameters can scale as $n_{in} \times n_{out}$. This can be beneficial because the number of parameters is not a product (multiple) of the filter size.

Accordingly, in some embodiments, the backend CNN can be a three-layer CNN with one dimension-reduction layer followed by a layer with filter size 3 and a layer with filter size 5. The number of parameters of this backend CNN can be: $2048 \times n_1 + n_1 \times n_2 \times 3 + n_2 \times n_{engines} \times 5$. $n_1$ and $n_2$ could be independent since the number of parameters will still largely be determined by $n_1$. In some embodiments, $n_2$ can be equal to $n_1$.

Using Different Output Layers of Frontend Neural Network as Inputs

As previously described, outputs from one or more layers of the frontend neural network (e.g., speech recognition neural network) can be used as inputs to the backend neural network (e.g., engine prediction neural network). In some embodiments, only outputs from the last hidden layer are used as inputs to the backend neural network. In some embodiments, the first and last hidden layers can be used as inputs for the backend neural network. In another example, outputs from the second and the penultimate hidden layers can be used as inputs to the backend neural network. Outputs from other combinations of layers are contemplated and are within the scope of this disclosure. For example, outputs from the first and fourth layers can be used as inputs. In another example, outputs from the second and fifth layers can also be used.

Figure 5:
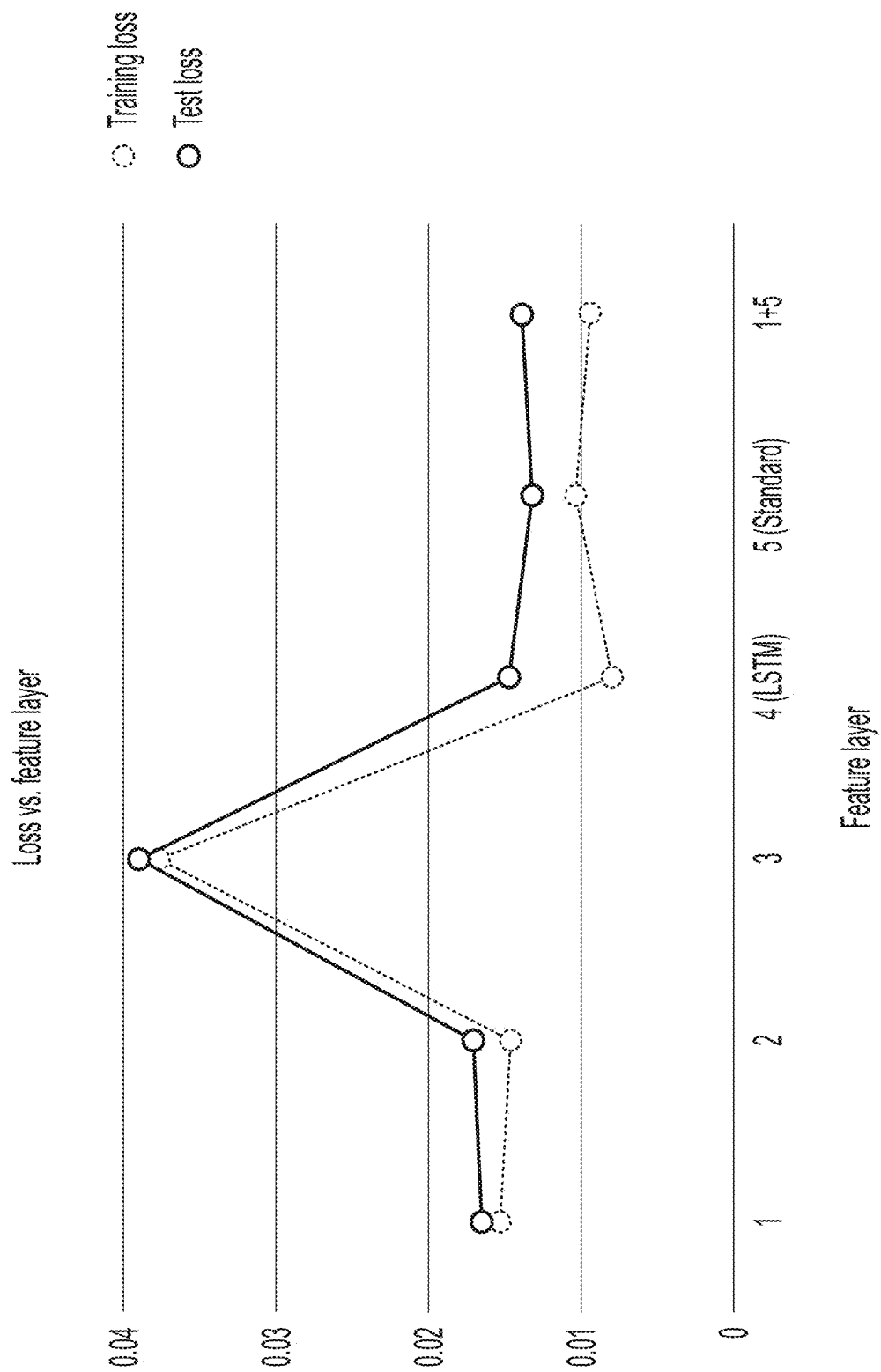
FIG. 5 is a chart illustrating empirical data of loss vs outputs of layer used in accordance with some aspects of the disclosure.

FIG. 5 is a chart 500 illustrating the loss vs. outputs of layer(s) (used as inputs to the backend neural network). To generate chart 500, the backend CNN structure and parameters are kept constant while the source of its inputs are changed. For example, outputs only from the first, second, third, fourth or fifth layer were used as inputs. A combination of outputs from layer 1 and 5 were as used as inputs to the backend CNN. The CNN structured was unchanged (except for layer 4 which has 4096 outputs due to the forward and backward LSTMs and the 1+5 combination which similarly also has 4096 outputs) but it was retrained in each case.

As shown in FIG. 5, outputs from layer 5 appear to provide the best results (though the results are within a margin of error). Additionally, the last point shows the combined features of layers 1 and 5 as inputs. Here, the larger gap between the training loss and the test loss can imply that there exists some overfitting.

Autoencoders

As in many neural networks, overfitting can be an issue. Overfitting occurs when the training data set is smaller than an equivalent data set. In transcription, the number of outputs is effectively reduced to a single number (the word error rate) per engine per audio segment. With a large number of features (e.g., input features) being extracted from the frontend neural network, the number of parameters in the frontend neural network is similarly large as the number of parameters in a layer, which scales as the product of the input and output features. In other words, the number of input channels can be very large and can approach an impractical large value.

In some embodiments, the number of input channels can be reduced without the need to re-train the entire frontend neural network, while keeping 2048 input features per time step in one layer constant, by using an autoencoder.

An autoencoder is a feed-forward network that takes a signal and applies a transformation to modify an intermediate state, and then applies another transformation to reproduce the original signal. In some embodiments, additional restrictions can be placed on that intermediate state. In this embodiment, the restriction can impose the intermediate state to have a lower dimension than the original signal. In other words, the autoencoder can be a dimension reduction autoencoder as it is forced to represent the original signal in a lower dimensional space while learning the most dominant features of that signal.

Autoencoders can be trained using the signal itself, no external ground truth is required. Furthermore, the effective amount of training data scales well with the dimensionality of the signal. In some embodiments, autoencoder can be used to reduce the 2048 input features per time step (and roughly 500 time steps per audio file) to a single number per engine. During the training process, the autoencoder starts with 2048 features per time step. This translates to roughly five orders of magnitude more training data based on the same quantity of raw audio for the autoencoder as compared to the orchestrator. With that much training data overfitting is not an issue. The autoencoder can be trained independently and accurately apart from the training of the backend neural network. And a good autoencoder can reduce the dimensionality of the signal without losing much information and this reduced dimensionality translates directly into fewer parameters in our orchestration model which reduces the potential for overfitting.

Figure 6:
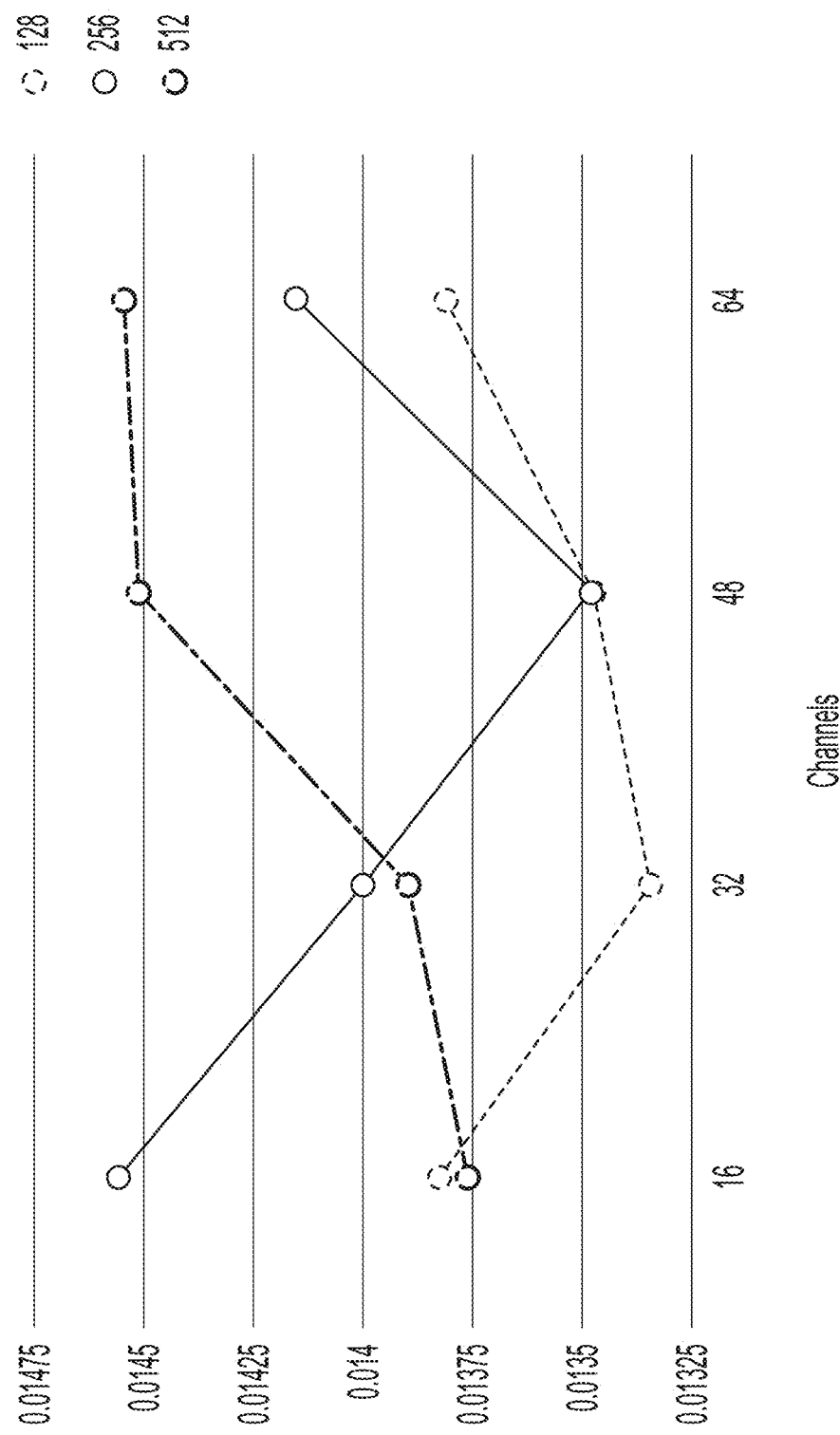
FIG. 6 is a chart illustrating empirical data of loss vs the channel size of the autoencoder neural network in accordance with some aspects of the disclosure.

FIG. 6 shows losses on the test set for various sizes of autoencoder vs the number of channels in the output of the first layer in the orchestration network. It should be noted that the number of parameters (and therefore the potential for overfitting) scales roughly as the product of the input and output channels. Further, more output channels means more information is being carried over to the rest of the network and can potentially lead to more accurate predictions.

As shown in FIG. 6, there is a sweet spot for each size of autoencoder which balances these two factors. Exactly where the sweet spot occurs can vary with the size of the autoencoder model. However, as expected, a smaller autoencoder benefits more from more output channels. In some embodiments, an autoencoder having 256 channels is selected, which yields the best overall results.

Figure 7:
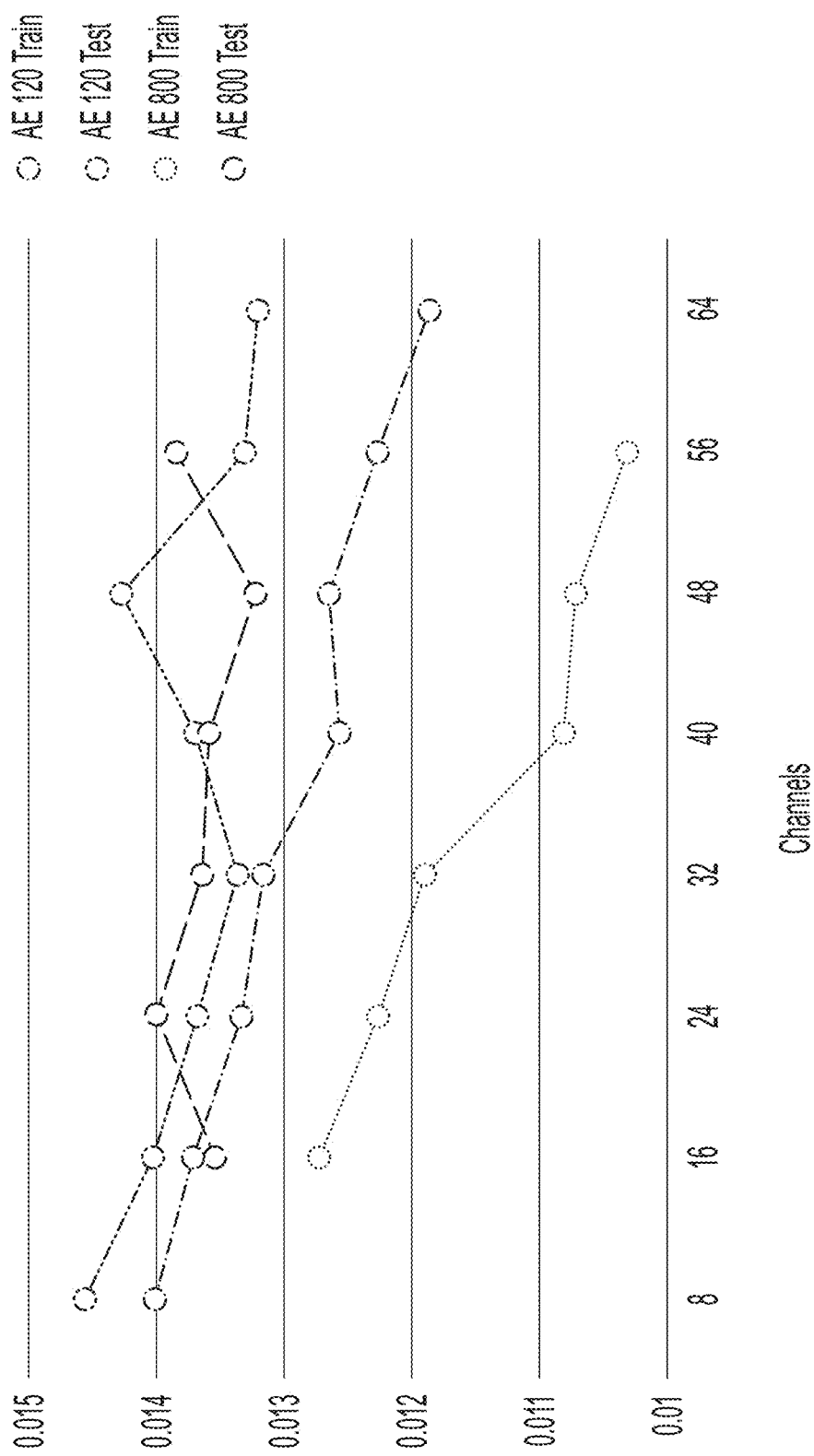
FIG. 7 is a chart illustrating empirical data of loss vs training time and channel size of the autoencoder neural network in accordance with some aspects of the disclosure.

During trial runs to collect empirical data, reasonable results can be obtained after around 100 epochs of training. To determine whether results would improve with more training, the autoencoder was trained for a much longer time, around 800 epochs. FIG. 7 shows the losses for the training and testing trail runs for various numbers of channel. As shown in FIG. 7, training the autoencoder for longer can translate to lower losses for the autoencoder, and there was no sign of overfitting. Autoencoder which was trained for longer was producing a more accurate representation of the signal. One speculation for this result is that accuracy itself is the problem. Having a less accurate representation of the original signal effectively means that noise is added to the system. Here, noise itself can be thought of as a kind of regulation that prevents overfitting much in the same way as a dropout of a term. In conclusion, the results do seem to indicate that there is little value to having a finely tuned autoencoder model.

Example Systems

Figure 8:
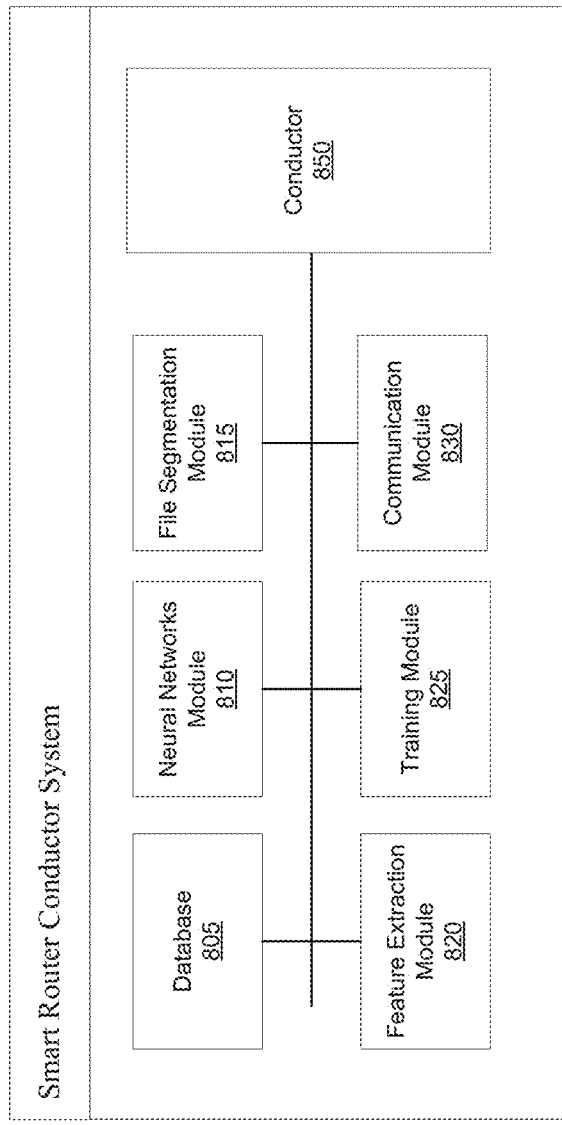
FIG. 8 is a block diagram illustrating the smart router conductor system in accordance with an aspect of the disclosure.

FIG. 8 is a system diagram of an exemplary smart router conductor system 800 for training one or more neural networks and performing transcription using the trained one or more neural networks in accordance with some embodiments of the present disclosure. System 800 may include a database 805, file segmentation module 810, neural networks module 815, feature extraction module 820, training module 825, communication module 830, and conductor 1150. System 800 may reside on a single server or may be distributed at various locations on a network. For example, one or more components or modules (e.g., 805, 810, 815, etc.) of system 800 may be distributed across various locations throughout a network. Each component or module of system 800 may communicate with each other and with external entities via communication module 830. Each component or module of system 800 may include its own sub-communication module to further facilitate with intra and/or inter-system communication.

Database 805 can include training data sets and customers ingested data. Database 805 can also include data collected by a data aggregator (not shown) that automatically collects and index data from various sources such as the Internet, broadcasted radio stations, broadcasted TV stations, etc.

File segmentation module 810 includes algorithms and instructions that, when executed by a processor, cause the processor to segment a media file into a plurality of segments as described above with respect to at least subprocess 105 of FIG. 1 and subprocess 205 of FIG. 2.

Neural networks module 815 can be an ecosystem of neural networks that includes a hybrid deep neural network (e.g., neural network 300), pre-trained speech recognition neural networks (e.g., neural network 350), engine prediction neural network (e.g., neural network 360), transcription neural networks (e.g., engines), other classification neural networks of varying architectures. Transcription engines can include local transcription engine(s) and third-party transcription engines such as engines provided by IBM®, Microsoft®, and Nuance®, for example.

Feature extraction module 820 includes algorithms and instructions that, when executed by a processor, cause the processor to extract audio features of each media segment as described above with respect to at least subprocesses 110 and 210 of FIGS. 1 and 2, respectively. Feature extraction module 820 can work in conjunction with other modules of system 800 to perform the audio feature extraction as described in subprocesses 110 and 210. For example, feature extraction module 820 and neural networks module 810 can be configured to cooperatively perform the functions of subprocesses 110 and 210. Additionally, neural networks module 810 and feature extraction module 820 can share or have overlapping responsibilities and functions.

Training module 820 includes algorithms and instructions that, when executed by a processor, cause the processor to perform the respective functions and features of at least subprocesses 115, 120, and 125 of FIG. 1. For example, training module 820 can be configured to train a neural network to predict the WER of an engine for each segment based at least on audio features of each segment by mapping the engine WER of each segment to audio features of the segment.

Conductor 850 includes algorithms and instructions that, when executed by a processor, cause the processor to perform the respective the functions and features of the smart router conductor as describe above with respect, but not limited, to processes 100 and 200. For example, conductor 850 includes algorithms and instructions that, when executed by a processor, cause the processor to: segment the media file into a plurality of segments; extract, using a first neural network, audio features of a first and second segment of the plurality of segments; and identify, using a second neural network, a best-candidate engine for each of the first and second segments based at least on audio features of the first and second segments.

In another example, conductor 850 includes algorithms and instructions that, when executed by a processor, cause the processor to: segment the audio file into a plurality of audio segments; use a first audio segment of the plurality of audio segments as inputs to a deep neural network; and use outputs of one or more hidden layers of the deep neural network as inputs to a second neural network that is trained to identify a first transcription engine having a highest predicted transcription accuracy among a group of transcription engines for the first audio segment based at least on the outputs of the one or more hidden layers of the deep neural network.

It should be noted that one or more functions of each of the modules (e.g., 805, 810, 815, 820, 825, 830) in transcription system 800 can be shared with another modules within transcription system 800.

Figure 9:
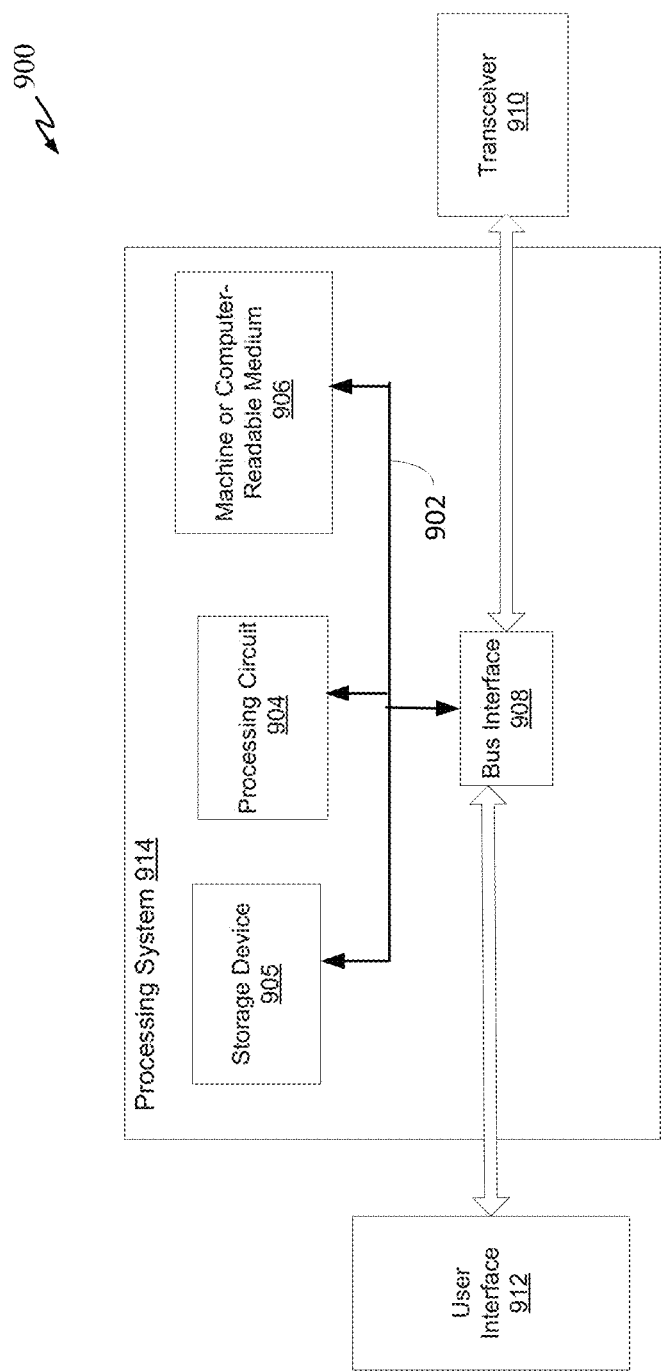
FIG. 9 is a diagram illustrating an exemplary hardware implementation of the smart router conductor system in accordance with some aspects of the disclosure.

FIG. 9 illustrates an exemplary system or apparatus 900 in which processes 100 and 200 can be implemented. In accordance with various aspects of the disclosure, an element, or any portion of an element, or any combination of elements may be implemented with a processing system 914 that includes one or more processing circuits 904. Processing circuits 904 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 904 may be used to implement any one or more of the processes described above and illustrated in FIGS. 1-5, 8, 9, 10, and 11.

In the example of FIG. 9, the processing system 914 may be implemented with a bus architecture, represented generally by the bus 902. The bus 902 may include any number of interconnecting buses and bridges depending on the specific application of the processing system 914 and the overall design constraints. The bus 902 may link various circuits including one or more processing circuits (represented generally by the processing circuit 904), the storage device 905, and a machine-readable, processor-readable, processing circuit-readable or computer-readable media (represented generally by a non-transitory machine-readable medium 906). The bus 902 may also link various other circuits such as, but not limited to, timing sources, peripherals, voltage regulators, and power management circuits, which are well known in the art, and therefore, will not be described any further. The bus interface 908 may provide an interface between bus 902 and a transceiver 910. The transceiver 910 may provide a means for communicating with various other apparatus over a transmission medium. Depending upon the nature of the apparatus, a user interface 912 (e.g., keypad, display, speaker, microphone, touchscreen, motion sensor) may also be provided.

The processing circuit 904 may be responsible for managing the bus 902 and for general processing, including the execution of software stored on the machine-readable medium 906. The software, when executed by processing circuit 904, causes processing system 914 to perform the various functions described herein for any particular apparatus. Machine-readable medium 906 may also be used for storing data that is manipulated by processing circuit 904 when executing software.

One or more processing circuits 904 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 906. The machine-readable medium 906 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as, but not limited to, portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 906 may reside in the processing system 914, external to the processing system 914, or distributed across multiple entities including the processing system 914. The machine-readable medium 906 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

Further Discussion of Example Embodiments

In a first example method for transcribing a media file, a media file is segmented into a plurality of segments. Audio features of the first and second segment of the plurality of segments are then extracted using a first neural network that is trained to perform speech recognition. Next, the method uses a second neural network to identify a best-candidate engine for each of the first and second segments based at least on audio features of the first and second segments. The best-candidate engine is a neural network having a highest predicted transcription accuracy among a collection of neural networks.

In a first aspect of the first example method, the method further includes: requesting a first best-candidate engine for the first segment to transcribe the first segment; requesting a second best-candidate engine for the second segment to transcribe the second segment; receiving a first transcribed portion of the first segment from the first best-candidate engine in response to requesting the first best-candidate engine to transcribe the first segment; receiving a second transcribed portion of the second segment from the second best-candidate engine in response to requesting the second best-candidate engine to transcribe the second segment; and generating a merged transcription using the first and second transcribed portions.

In a second aspect of the first example method, segmenting the media file comprises segmenting the media file at location of the media file where no speech is detected. The second aspect of the first example method may be implemented in combination with the first and/or second aspect of the first example method, though the example embodiments are not limited in this respect.

In a third aspect of the first example method, extracting using the first neural network comprises using a deep neural network to extract audio features of the first and second segments. The third aspect of the first example method may be implemented in combination with the first, second, and/or third aspect of the first example method, though the example embodiments are not limited in this respect.

In a first implementation of the third aspect, using the deep neural network to extract audio features comprises using outputs of one or more hidden layers of the deep neural network as inputs to the second neural network. Using the deep neural network to extract audio features can also comprise using outputs of a last hidden layer of the deep neural network as inputs to the second neural network.

In a fourth aspect of the first example method, the second neural network can be trained to predict a word error rate (WER) of a plurality of transcription engines based at least on audio features extracted from each segment. The fourth aspect of the first example method may be implemented in combination with the first, second, third, and/or fourth aspect of the first example method, though the example embodiments are not limited in this respect.

In a first implementation of the fourth aspect, identifying the best-candidate engine for each of the first and second segments comprises identifying a transcription engine with a lowest WER for each segment.

In a second example method for transcribing an audio file, the method comprises: using an audio file as inputs to a deep neural network trained to perform speech recognition; and using outputs of one or more hidden layers of the deep neural network as inputs to a second neural network that is trained to identify a first transcription engine having a highest predicted transcription accuracy among a group of transcription engines for the audio file based at least on the outputs of the one or more hidden layers of the deep neural network.

In a first aspect of the second example method, the second neural network is trained to predict a word error rate (WER) of the group of transcription engines based at least on outputs of the one or more hidden layers of the deep neural network. The engine with a lowest WER is the engine with the highest predicted transcription accuracy.

In a third example method for training a neural network to transcribe a media file. The third example method comprises: segmenting the media file into a plurality of segments; inputting each segment, one segment at a time, of the plurality of segments into a first neural network trained to perform speech recognition; extracting outputs, one segment at a time, from one or more layers of the first neural network; and training a second neural network to generate a predicted-WER (word error rate) of a plurality of transcription engines for each segment based at least on outputs from the one or more layers of the first neural network.

In a first aspect of the third example method, training the second neural network to generate a predicted-WER of the plurality of transcription engines further comprises: transcribing each segment using the plurality of transcription engines to generate a transcription of each segment; generating a WER of each transcription engine for each segment based at least on ground truth data and the transcription of each segment; and training the second neural network to learn relationships between the generated WER of each transcription engine and outputs from the one or more layers of the first neural network for each segment.

In a second aspect of the third example method, the second neural network can be a convolutional neural network having two hidden layers and a pooling layer between the two hidden layers. The second aspect of the third example method may be implemented in combination with the first and/or second aspect of the third example method, though the example embodiments are not limited in this respect.

In a third aspect of the third example method, extracting outputs from one or more layers of the first neural network comprises extracting outputs from a last hidden layer of the deep neural network. The third aspect of the third example method may be implemented in combination with the first, second, and/or third aspect of the third example method, though the example embodiments are not limited in this respect.

In a fourth aspect of the third example method, the third example method further includes using an autoencoder neural network to reduce a number of input features from each segment such that a number of outputs from the first neural network are reduced. The fourth aspect of the third example method may be implemented in combination with the first, second, third, and/or fourth aspect of the third example method, though the example embodiments are not limited in this respect.

In an implementation of the fourth aspect, the autoencoder can have approximately 256 channels.

In a first example system for transcribing a media file, the first example system includes a memory and one or more processors configured to: segment the media file into a plurality of segments; extract, using a first neural network, audio features of a first and second segment of the plurality of segments, wherein the first neural network is trained to perform speech recognition; and identify, using a second neural network, a best-candidate engine for each of the first and second segments based at least on audio features of the first and second segments.

In a second example system for training a neural network to transcribe a media file, the second example system includes a memory and one or more processors coupled to the memory. The one or more processors of the second example system are configured to: segment the media file into a plurality of segments; input each segment of the plurality of segments into a first neural network trained to perform speech recognition; extract outputs from one or more layers of the first neural network; and train a second neural network to generate a predicted-WER of a plurality of transcription engines for each segment based at least on outputs from the one or more layers of the first neural network.

CONCLUSION

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The embodiments described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

What is claimed is:

1. A method for transcribing a media file, the method comprising:
    segmenting the media file into a plurality of segments;
    extracting, using a first neural network, audio features of a first and second segment of the plurality of segments, wherein the first neural network is trained to perform speech recognition; and
    identifying, using a second neural network, a best-candidate engine for each of the first and second segments based at least on audio features of the first and second segments, wherein the best-candidate engine is a neural network having a highest predicted transcription accuracy among a collection of neural networks.

2. The method of claim 1, further comprising:
    requesting a first best-candidate engine for the first segment to transcribe the first segment;
    requesting a second best-candidate engine for the second segment to transcribe the second segment;
    receiving a first transcribed portion of the first segment from the first best-candidate engine in response to requesting the first best-candidate engine to transcribe the first segment;
    receiving a second transcribed portion of the second segment from the second best-candidate engine in response to requesting the second best-candidate engine to transcribe the second segment; and
    generating a merged transcription using the first and second transcribed portions.

3. The method of claim 1, wherein segmenting the media file comprises segmenting the media file at location of the media file where no speech is detected.

4. The method of claim 1, wherein extracting using the first neural network comprises using a deep neural network to extract audio features of the first and second segments.

5. The method of claim 4, wherein using the deep neural network to extract audio features comprises using outputs of one or more hidden layers of the deep neural network as inputs to the second neural network.

6. The method of claim 5, wherein the deep neural network comprises a recurrent neural network, and the second neural network comprises a convolutional neural network.

7. The method of claim 5, wherein using outputs of one or more hidden layers of the deep neural network as inputs comprises using outputs of a last hidden layer of the deep neural network as inputs to the second neural network.

8. The method of claim 1, wherein the second neural network is trained to predict a word error rate (WER) of a plurality of transcription engines based at least on audio features extracted from each segment.

9. The method of claim 8, wherein identifying the best-candidate engine for each of the first and second segments comprises identifying a transcription engine with a lowest WER for each segment.

10. A system for transcribing a media file, the system comprising:
    a memory; and
    one or more processors coupled to the memory, the one or more processor configured to:
      segment the media file into a plurality of segments;
      extract, using a first neural network, audio features of a first and second segment of the plurality of segments, wherein the first neural network is trained to perform speech recognition; and
      identify, using a second neural network, a best-candidate engine for each of the first and second segments based at least on audio features of the first and second segments, wherein the best-candidate engine is a neural network having a highest predicted transcription accuracy among a collection of neural networks.

11. The system of claim 10, wherein the one or more processors are further configured to:
    request a first best-candidate engine for the first segment to transcribe the first segment;
    request a second best-candidate engine for the second segment to transcribe the second segment;
    receive a first transcribed portion of the first segment from the first best-candidate engine in response to requesting the first best-candidate engine to transcribe the first segment;
    receive a second transcribed portion of the second segment from the second best-candidate engine in response to requesting the second best-candidate engine to transcribe the second segment; and
    generate a merged transcription using the first and second transcribed portions.

12. The system of claim 10, wherein the one or more processors are configured to extract audio features of the first and second segments using a deep neural network.

13. The system of claim 12, wherein the one or more processors are configured to extract audio features of the first and second segments using outputs of one or more hidden layers of the deep neural network as inputs to the second neural network.

14. The system of claim 13, wherein the deep neural network comprises a recurrent neural network, and the second neural network comprises a convolutional neural network.

15. The system of claim 13, wherein the one or more processors are further configured to: using an autoencoder neural network to reduce a number of outputs from the first neural network by reducing a number of inputs to the first neural network to reduce overfitting.

16. The system of claim 10, wherein the second neural network is trained to predict a word error rate (WER) of a plurality of transcription engines based at least on audio features extracted from each segment.

17. A method for transcribing an audio file, the method comprising:
    using an audio file as inputs to a deep neural network trained to perform speech recognition; and
    using outputs of one or more hidden layers of the deep neural network as inputs to a second neural network that is trained to identify a first transcription engine having a highest predicted transcription accuracy among a group of transcription engines for the audio file based at least on the outputs of the one or more hidden layers of the deep neural network.

18. The method of claim 17, wherein the second neural network is trained to predict a word error rate (WER) of the group of transcription engines based at least on outputs of the one or more hidden layers of the deep neural network and on characteristics of each respective engine of the group of transcription engines, and wherein an engine with a lowest WER is the engine with the highest predicted transcription accuracy.

19. The method of claim 17, wherein the deep and second neural networks comprise a recurrent neural network and a convolutional neural network, respectively.

20. The method of claim 17, wherein using outputs of one or more hidden layers comprises using outputs of a first and last layer of the hidden layers of the deep neural network.

* * * * *